United States Patent [19]
Johnson

[11] Patent Number: 5,903,370
[45] Date of Patent: May 11, 1999

[54] SYSTEM FOR AN OPTICAL DOMAIN

[75] Inventor: William Arthur Johnson, Plano, Tex.

[73] Assignee: MCI Communications Corporation, Washington, D.C.

[21] Appl. No.: 08/670,849

[22] Filed: Jun. 28, 1996

[51] Int. Cl.⁶ .............................. H04B 10/24; H04B 10/12
[52] U.S. Cl. ......................... 359/119; 359/117; 359/161; 359/166
[58] Field of Search .................................. 359/119, 110, 359/128, 139, 161, 166, 117

[56] References Cited

U.S. PATENT DOCUMENTS

| | | | |
|---|---|---|---|
| 4,451,916 | 5/1984 | Casper et al. | 370/16 |
| 4,527,270 | 7/1985 | Sweeton | 371/11 |
| 4,542,502 | 9/1985 | Levinson et al. | 370/88 |
| 4,560,246 | 12/1985 | Cotter | 350/96.16 |
| 4,561,119 | 12/1985 | Epworth | 455/609 |
| 4,596,982 | 6/1986 | Bahr et al. | 340/825.05 |
| 4,704,714 | 11/1987 | Tomizawa et al. | 370/15 |
| 4,745,597 | 5/1988 | Morgan et al. | 370/87 |
| 4,763,315 | 8/1988 | Nakayashiki et al. | 370/16 |
| 4,768,190 | 8/1988 | Giancarlo | 370/86 |
| 4,797,589 | 1/1989 | Collins | 370/63 |
| 4,821,255 | 4/1989 | Kobrinski | 370/3 |
| 4,831,662 | 5/1989 | Kuhn | 455/608 |
| 4,845,736 | 7/1989 | Posner et al. | 379/27 |
| 4,866,699 | 9/1989 | Brackett et al. | 370/3 |
| 4,887,256 | 12/1989 | Nakayashiki et al. | 370/16 |
| 4,956,835 | 9/1990 | Grover | 370/16 |
| 4,964,095 | 10/1990 | Tyrrell et al. | 370/55 |

(List continued on next page.)

FOREIGN PATENT DOCUMENTS

| | | |
|---|---|---|
| 0359352 A3 | 3/1990 | European Pat. Off. . |
| 0449475 A2 | 10/1991 | European Pat. Off. . |
| 0 507 379 | 10/1992 | European Pat. Off. . |
| 0 620 694 A2 | 10/1994 | European Pat. Off. . |
| 0 721 275 A2 | 7/1996 | European Pat. Off. . |
| 2 233 851 | 1/1991 | United Kingdom . |

OTHER PUBLICATIONS

Rabou et al., "Optical Fiber Two–Way FM Video Signal Transmission for Video Conferencing Application," *IEEE Transcations on Consumer Electronics*, vol. 40, No. 3, Aug. 1994, pp. 492–496.

Patent Abstracts of Japan, vol. 095, No. 001, Feb. 28, 1995, JP 06 291739 A, Oct. 18, 1994.

Patent Abstracts of Japan, vol. 12, No. 423, JP 63 160436 A, Jul. 4, 1988.

Hill et al., "A Transport Network Layer Based on Optical Network Elements," *Journal of Lightwave Technology*, vol. 11, No. 5/6, May/Jun. 1993, pp. 667–676.

(List continued on next page.)

*Primary Examiner*—Leslie Pascal

[57] ABSTRACT

A transmission-based restoration system and method restores a failure of an optical pipe within an optical domain. Restoration occurs in the same domain in which the failed optical pipe is located. First and second optical pipe rings and a first plurality of optical switch platforms are deployed within a domain. The first optical pipe ring carries optical communication signals in first and second opposing directions around the first optical pipe ring. The second optical pipe ring carries optical communication signals in first and second opposing directions around the second optical pipe ring. Each optical switch platform is connected to the first optical pipe ring and the second optical pipe ring for switching the optical communication signals between the first and second optical pipe rings. When the first and second optical pipe rings both fail between adjacent first and second optical switch platforms, the first optical switch platform switches the optical communication signals carried in the first direction in the optical pipe ring to be carried in the second direction in the second optical pipe ring. The second optical switch platform switches the optical communication signals carried in the second direction in the first optical pipe ring to be carried in the first direction in the second optical pipe ring. Preemptive traffic, multiple domain switches, and redundant configurations are used.

15 Claims, 14 Drawing Sheets

5,903,370
Page 2

U.S. PATENT DOCUMENTS

| | | | |
|---|---|---|---|
| 5,058,105 | 10/1991 | Mansour et al. | 370/16 |
| 5,069,521 | 12/1991 | Hardwick | 385/24 |
| 5,081,452 | 1/1992 | Cozic | 340/825.5 |
| 5,091,902 | 2/1992 | Chopping et al. | 370/16.1 |
| 5,166,821 | 11/1992 | Huber | 359/238 |
| 5,179,548 | 1/1993 | Sandesara | 370/16.1 |
| 5,182,744 | 1/1993 | Askew et al. | 370/16 |
| 5,200,964 | 4/1993 | Huber | 372/26 |
| 5,218,465 | 6/1993 | Lebby et al. | 359/110 |
| 5,271,075 | 12/1993 | Gfeller et al. | 385/20 |
| 5,299,293 | 3/1994 | Mestdagh et al. | 359/110 |
| 5,327,427 | 7/1994 | Sandesara | 370/85.14 |
| 5,329,392 | 7/1994 | Cohen | 359/124 |
| 5,329,396 | 7/1994 | Fishman et al. | 359/173 |
| 5,329,520 | 7/1994 | Richardson | 370/16 |
| 5,333,130 | 7/1994 | Weissmann et al. | 370/16 |
| 5,341,364 | 8/1994 | Marra et al. | 370/16.1 |
| 5,343,464 | 8/1994 | Iino et al. | 370/16 |
| 5,359,450 | 10/1994 | Ramachandran et al. | 359/188 |
| 5,365,510 | 11/1994 | Nicholson et al. | 370/16 |
| 5,373,383 | 12/1994 | LaGasse | 359/161 |
| 5,373,385 | 12/1994 | Darcie et al. | 359/162 |
| 5,396,357 | 3/1995 | Goossen et al. | 359/119 |
| 5,420,868 | 5/1995 | Chraplyvy et al. | 370/122 |
| 5,434,691 | 7/1995 | Yamane | 359/117 |
| 5,442,472 | 8/1995 | Skrobko | 359/110 |
| 5,442,623 | 8/1995 | Wu | 359/110 |
| 5,446,725 | 8/1995 | Ishiwatari | 370/16.1 |
| 5,452,115 | 9/1995 | Tomioka | 359/123 |
| 5,457,555 | 10/1995 | Moriyama | 359/110 |
| 5,457,556 | 10/1995 | Shiragaki | 359/117 |
| 5,459,715 | 10/1995 | Furuta et al. | 370/16 |
| 5,479,608 | 12/1995 | Richardson | 395/182.02 |
| 5,495,471 | 2/1996 | Chow et al. | 370/16 |
| 5,517,489 | 5/1996 | Ogura | 370/16.1 |
| 5,602,828 | 2/1997 | Engdahl et al. | 370/228 |
| 5,625,478 | 4/1997 | Doerr et al. | 359/119 |
| 5,647,035 | 7/1997 | Cadeddu et al. | 359/119 |
| 5,680,235 | 10/1997 | Johansson | 359/119 |

OTHER PUBLICATIONS

Aida et al., "Optical Protection Switches for Trunk Transmission Systems," *IEEE International Conference on Communications '88*, vol. 1, Jun., 1988, pp. 1–5.

Bhagavath, V. K., "Reliability Evaluation and Protection Schemes for Dense WDM Network Architectures," *Supercomm / ICC '92: Discovering a New World of Communications*, 1992, pp. 307.2.1–307.2.5.

Brackett, C., "Dense Wavelength Division Multiplexing Networks: Principles & Applications," *IEEE Journal of Selected Areas in Communications*, vol. 8, No. 6, Aug., 1990, pp. 948–964.

Brooks et al., "An optical fibre supervisory sub–system employing an entirely optical telemetry path," *European Conference on Optical Communication*, Sep., 1982, pp. 400–405.

Chao et al., "FASTAR—A Robust System for Fast DS3 Restoration," *Globecom '91*, 1991, pp. 1396–1400.

DeMeis, R., "Select the Right Test Equipment for Your Fiber Optic Needs," *Laser Focus World*, Oct., 1995, pp. 161–173.

Elrefaie, "Multiwavelength Survivable Ring Network Architectures," *IEEE International Conference on Communications '93*, vol. 2, May, 1993, pp. 1245–1251.

Green, P., *Fiber Optic Networks*, Prentice Hall, 1993, pp. 7–10.

Grover, W.D., "Distributed Restoration of the Transport Network,"Chapter 11, *Telecommunications Network Management into the 21st Century, Techniques, Standards, Technologies and Applications*, Salah Aidarous and Thomas Plevyak editors, IEEE Press, ISBN 0–7803–1013–6, 1994, pp. 337–417.

Hadjifotiou et al., "Supervisory Options for Fibre Optical Amplifier Systems," *Fourth I.E.E. Conference on Telecommunication*, Conference Publication No. 371, Apr. 18, 1993, pp. 53–56.

Hecht, J., "Push is on for Multiwavelength Optical Networks," *Laser Focus World*, Oct., 1995, pp. 59–61.

Jensen et al., "Novel technique for monitoring long–haul undersea optical–amplifier systems," *Optical Fiber Communication*, vol. 4, Feb., 1994, pp. 256–257.

Matsuoka et al., "Supervisory Signal Transmission Methods for Optical Amplifier Repeater Systems," *IEEE*, 1990, pp. 1846–1850.

Minoli, D., *Telecommunications Technology Handbook*, Artech House, Norwood, MA, 1995, Chapters 3 and 7.

Murakami et al., "A Remote Supervisory System Based on Subcarrier Overmodulation for Submarine Optical Amplifier Systems," *IEEE: Journal of Lightwave Technology*, vol. 14, No. 5, May, 1996, pp. 671–677.

Park, E. et al., "Simultaneous All–Optical Packet–Header Replacement and Wavelength Shifting for Dynamically–Reconfigurable WDM Network," *IEEE Photonics Technology Letters*, vol. 7, No. 7, Jul., 1995, pp. 810–812.

Riaziat, M. L. et al., "Optical Wavelength Shifting by Traveling–Wave Electrooptic Modulation," *IEEE Photonics Technology Letters*, vol. 5, No. 9, Sep. 1993, pp. 1002–1005.

Spirit, D. M. et al., Eds. *High Capacity Optical Transmission Explained*, John Wiley & Sons, West Sussex, England, 1995, Chapters 1, 6, and 7.

Wagner et al., "Multiwavelength Ring Networks for Switch Consolidation and Interconnection," *Supercomm/International Conference on Communications*, vol. 3, pp. 1173–1179 (Jun. 1992).

Waynant et al., "Optical Integrated Circuits," *Electro–Optics Handbook*, McGraw–Hill, Inc., USA, 1994, Chapter 26, pp. 26.1–26.39.

Wehr, M. "Wavelength division multiplexing in transmission networks," *Commutation & Transmission*, vol. 17, No. 2, pp. 29–34 (1995).

Wu, T., "Emerging Technologies for Fiber Network Survivability," *IEEE Communications Magazine*, Feb., 1995, pp. 58–74.

Wu, T. et al., "Strategies and Technologies for Planning a Cost–Effective Survivable Fiber Network Architecture Using Optical Switches," *IEEE International Conference on Communications*, 1989, pp. 23.6.1–23.6.7.

Yamabayashi et al., "Supervisory Signal Transmission by Modulating the mB1C Code Complementary Bit," *IEEE: Journal of Hightwave Technology*, vol. 9, No. 3, Mar., 1991, pp. 381–385.

Zhou, J. et al., "Four–Wave Mixing Wavelength Coversion Efficiency in Semiconductor Traveling–Wave Amplifiers Measured to 65 nm of Wavelength Shift," *IEEE Photonics Technology Letters*, vol. 6, No. 8, Aug., 1994, pp. 984–987.

COMMUNICATIONS NETWORK

ELECTRO-OPTICAL DOMAIN ARCHITECTURE

ELECTRO-OPTICAL DOMAIN ARCHITECTURE

IDENTIFICATION OF FIBER BREAK

ODR INSTRUCTION BROADCAST

SYSTEM FOR AN OPTICAL DOMAIN

BACKGROUND OF THE INVENTION

1. Field of the Invention

The present invention relates to restoring failed communication links in a communication network. More particularly, the present invention relates to a system and method for restoring communication in an optical domain of a communication network.

2. Related Art

Current restoration techniques for restoring communication traffic interrupted by a break or other failure in a fiber optic cable use electronic cross-connects for provisioning spare capacity. These techniques are extremely expensive and complex.

FIG. 1 shows a block diagram of an exemplary communication network 10 having at least optical three domains, or sub-networks, 12–14 shown as contiguous rings. Domains 12–14 operate independently from each other and are connected together by nodes or gateways 15–19, which are usually electrical cross-connects. As shown in FIG. 1, domain 12 is connected to a domain (not shown) through gateway 15, to domain 13 through gateway 17, and to domain 14 through gateway 16. Domain 13 is connected to domain 14 through gateway 18 and to a domain (not shown) through gateway 19. Domains 12–14 may also include other gateways, which are not also not shown. In the present example, communication traffic 11 traverses domains 12 and 13.

FIG. 2 shows a situation in which an optical fiber of domain 13 has been cut at 20 between gateways 17 and 19 by construction equipment 21. Traffic 11 is restored, however, through gateways 18 and 19.

FIG. 3 shows a simplified hierarchical network model 30 of a typical multi-layer restoration process for a communication network which can be used for restoring communication traffic 11 through network 10. The left-most column of blocks of FIG. 3 represents layers of the network. The center column of blocks represents the particular restoration process used at each corresponding network layer. The right-most column of blocks sets forth the alarm and database requirements at each corresponding network layer.

Each of the physical, logical and service layers 31, 34, and 37 of network model 30 contributes to the overall restoration process for maximizing use of expensive spare transmission capacity of the network. At the physical layer 31, the restoration process is a transmission-based restoration process 32, so named because it is activated by transmission alarms. At this level of the restoration process, the physical layer receives rerouting instructions from a transmission topology database (see block 33).

If the physical layer 31 lacks sufficient capacity for restoring all circuits affected by a failure, the restoration process proceeds to the logical layer 34 of model 30. At the logical layer, restoration is a circuit-based restoration process 35 activated by circuit alarms that searches for individual spare circuits which can be linked together based on a circuit database for restoring additional traffic around the fiber cut (see block 36).

If there are any remaining circuits that have not been restored by the first two layers of model 30, restoration proceeds to service layer 37 for an application-based restoration process 38. Application alarms are activated and the remaining circuits are rerouted by the application-based restoration process based on a network topology database (see block 39).

It is desired that communication traffic 11 be automatically restored within the domain having a failure so that the respective domains remain completely independent from each other. This results in network management being simplified by analysis of alarm information occurring only within the domain of the failure for determining the location of the fiber cut, and by not allowing circuit level alarms resulting from the fiber cut to permeate through the entire network 10.

Presently, electrical cross-connects are used at the gateways of the domains as the principle switching components for network restoration. If every circuit within a domain, whether traffic bearing or spare, is to be restored within the domain in which there is a failure, every circuit must enter and exit the cross-connects. This means that an electrical cross-connect restoration system has a disadvantage of a centralized network management system that requires full knowledge of every circuit on the network for automatically "building" restoration routes. Thus, a large accurate database must be maintained and searched each time a restoration process is activated. Future broadband services further complicate these issues by requiring concatenation instructions and knowledge mapping formats in addition to knowledge of the location of each circuit.

Additionally, since the cross-connect restoration process is circuit-based, circuit alarms are used for indicating that a failure has occurred. Given a large number of circuits on a network and that many events other than fiber cuts cause circuit alarms, such as maintenance procedures, circuit-based restoration systems require a complex network management analysis engine. Such a complex network management analysis engine must be capable of determining exactly where restoration capacity is required and separating actual outages from day-to-day events that can also cause circuit alarms.

Use of electrical cross-connects also precludes use of express optical pipes and, in general, makes the domain architecture unacceptable because of electrical cross-connect cost and size.

FIG. 4A shows a conventional domain 40 having four electrical cross-connect nodes or gateways. Each electrical cross-connect 41–44 is connected to an OC-48 transport line terminating equipment (LTE) 45 via OC-12 optical connections 46. Communication traffic enters and exits domain 40 only through the gateway cross-connects 41–44. Typically, low speed electrical communication traffic is input to the gateway cross-connect and multiplexed and converted into higher speed optical signals. For example, cross-connect 41 represents a broadband SONET digital cross-connect switch (DACS) receiving STS-1/DS-3 type traffic. Multiple electrical signals are then multiplexed, converted to optical form, and routed through the DACS 41 as shown to OC-12 optical connections 46. The OC-12 signals can then be multiplexed to OC-48 signals allowing an even greater volume of data to be transported at even higher bit rates over the working optical pipe ring 47 (or alternatively the spare optical pipe ring 48). Conversely, when traffic is to be output from a gateway cross-connect, the traffic is demultiplexed and converted back to low speed electrical signals STS-1/DS-3 type traffic.

Under normal conditions, communication traffic within domain 40 is carried on an outside optical pipe ring 47, while an inside optical pipe ring 48 is composed of dedicated spare capacity held in reserve for restoration purposes. The spare capacity is not connected for passing traffic through each node 41–44 under normal operating conditions.

FIG. 4B shows domain 40 having a fiber cut 49 breaking optical pipe rings 47 and 48 between gateway electrical cross-connects 42 and 43. These electrical cross-connects 42 and 43 on either side of break 49 respond by rerouting the communication traffic in the outside working ring 47 into the inside ring 48. Re-routing is accomplished only through complex provisioning at the electrical circuit signal level. Moreover, every traffic-bearing and spare circuit must enter and exit the cross-connect for domain restoration. This makes the domain architecture unacceptable because of the increased cross-connect size, cost, and complexity for restoration. Because all circuits—traffic-bearing and spare must enter and exit the cross-connect—this architecture is further undesirable as it precludes the use of express optical pipes through a node.

What is needed is optical domain restoration system and method for restoring a failure of an optical pipe within the same optical domain in which the failed optical pipe is located. An all-optical transmission-based restoration system and method is needed for working and spare optical rings which optimizes the use of spare capacity and restores optical communication signals through optical switching without breaking signals down to an electrical circuit level and precluding the use of express pipes.

SUMMARY OF THE INVENTION

The present invention provides a transmission-based restoration system and method for restoring data communication in the event of a failure of an optical pipe within a network domain. This optical domain restoration (ODR) occurs in the same optical domain in which the failed optical pipe is located. An all-optical transmission-based restoration system and method is provided for working and spare optical rings which optimizes the use of spare capacity and restores optical communication signals through optical switching without breaking signals down to an electrical circuit level. Express optical pipes can be used in conjunction with optical domain restoration.

To achieve such optical domain restoration, the present invention includes first and second optical pipe rings and a first plurality of optical switch platforms within a domain. The first optical pipe ring carries optical communication signals in first and second directions around the first optical pipe ring with the first direction around the first optical pipe ring being opposite the second direction. The second optical pipe ring carries optical communication signals in first and second opposing directions around the second optical pipe ring. The first direction around the second optical pipe ring is also in a substantially same direction as the first direction around the first optical pipe ring. The first plurality of optical switch platforms are each connected to the first optical pipe ring and the second optical pipe ring for switching the optical communication signals into and out of the first and second optical pipe rings.

When the first and second optical pipe rings both fail between adjacent first and second optical switching platforms, the first optical switch platform switches the optical communication signals carried in the first direction in the first optical pipe ring between the first optical switch platform and the second optical switch platform to be carried in the second direction in the second optical pipe ring between the first optical switch platform and the second optical switch platform. The second optical switch platform switches the optical communication signals carried in the second direction in the first optical pipe ring between the second optical switch platform and the first optical switch platform to be carried in the first direction in the second optical pipe ring between the second optical switch platform and the first optical switch platform.

According to a further feature, each optical switch platform includes an optical receiver. A mediation device generates an alarm based on a loss of received light when at least one of the first and second optical pipe rings fails. A central management operating system generates and sends transmission-based restoration commands in response to alarms to control the switching of first and second optical switch platforms. Preferably, the central management unit includes a memory for storing a state table of the transmission-based restoration commands including Restore Clockwise, Restore Counter-Clockwise, and Bypass commands.

In another aspect of the invention, the first optical pipe ring preferably carries traffic having a higher priority than preemptive traffic carried by the second optical pipe ring. When the first and second optical pipe rings fail, the traffic carried by the first optical pipe ring is reversed and switched to the second optical pipe ring, thereby, preempting the preemptive traffic. At other times, however, the preemptive traffic can be carried on the second optical pipe ring, thereby, maximizing the utility of the spare capacity during normal and restoration operations.

The system of the present invention further allows for adjacent domains to share a common restoration path. A second domain includes a third optical pipe ring, a fourth optical pipe ring and a second plurality of optical switch platforms. The third optical pipe ring carries optical communication signals in first and second opposing directions around the third optical pipe ring with the first direction around the third optical pipe ring being in a substantially same relative direction as the first direction around the first optical pipe ring. The fourth optical pipe ring carries optical communication signals in first and second opposing directions around the fourth optical pipe ring with the first direction around the fourth optical pipe ring being in a substantially same direction as the first direction around the third optical pipe ring. The second plurality of optical switch platforms are each connected to the third optical pipe ring and the fourth optical pipe ring for switching the optical communication signals between the third and fourth optical pipe rings.

In another feature of the present invention, a common restoration path is used in a portion of the second optical pipe ring and a portion of the fourth optical pipe ring to provide a spare link between nodes common to both of the adjacent domains. The nodes common to both domains are further configured as three-way junctions.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art make and use the invention.

FIG. 10A shows node communications for identifying a fiber break to a central ODR operation system. FIG. 10B shows the subsequent restoration instructions broadcast to nodes in response to the identified fiber break.

The present invention will now be described with reference to the accompanying drawings. In the drawings, like reference numbers indicate identical or functionally similar elements.

DETAILED DESCRIPTION OF THE PREFERRED EMBODIMENTS

Overview and Example Environment

The present invention is directed to a transmission-based restoration system and process that uses spare optical capacity for rerouting communication traffic that has been lost as a result of a cutting of a fiber optic cable. The present invention takes full advantage of emerging Synchronous Optical NETwork (SONET) technology and simultaneously restores large volumes of traffic contained in optical pipes, unlike presently used circuit-based restoration processes that use electronic cross-connects for switching individual electrical circuits. Optical restoration according to the present invention is particularly suitable for transportation of high-bandwidth services since the coarse "granularity" of these services requires simultaneous handling of various broadband and concatenated signals. Additionally, use of standard SONET overhead and data communications greatly simplifies network management. When compared to presently-used restoration processes using electronic cross-conects, the system and process of the present invention has the advantages of low cost and simplicity.

The restoration system and process of the present invention can replace, or alternatively can augment, circuit-based restoration systems and processes in an overall restoration process for network management purposes.

The restoration concept of the present invention is described in an example environment of a transmission-based restoration approach because it is activated by transmission alarms and employs a transmission topology database. Description in these terms is provided for convenience only. It is not intended that the invention be limited to application in this example environment. In fact, after reading the following description, it will become apparent to a person skilled in the relevant art how to implement the invention in alternative environments.

The present invention divides a communication network into contiguous rings referred to as domains, or subnetworks. The domain architecture breaks a large network into small independent sub-networks and makes all aspects of network management and restoration less complicated. These domains are connected together by gateways, typically electronic cross-connects, and operate as independent entities. Inexpensive optical switch platforms are connected between the electronic cross-connects of the gateways and fiber optic cables within a domain. In the event of a break in a fiber optic cable, the optical switch platforms reverse and reroute communication traffic to dedicated spare capacity within the domain having the break restoring the communication traffic links. Configured in this way, the present invention removes a majority of the restoration burden from the cross-connect system, that is, the logical layer circuit-based restoration system.

Optical Domain Restoration Embodiment

Figure 1:
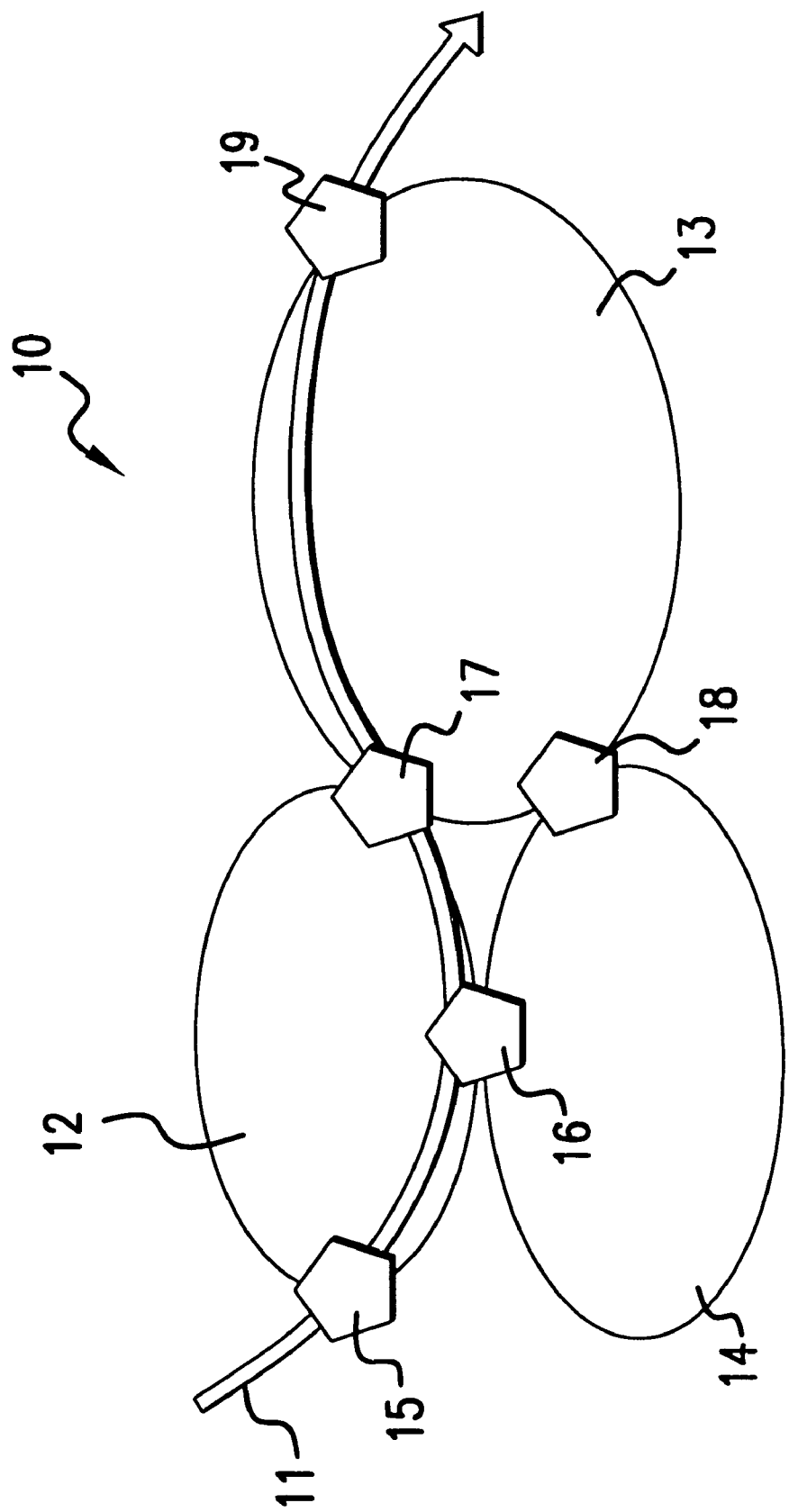
FIG. 1 shows a diagram of communication traffic traversing two domains of a communication network having three domains.
Figure 2:
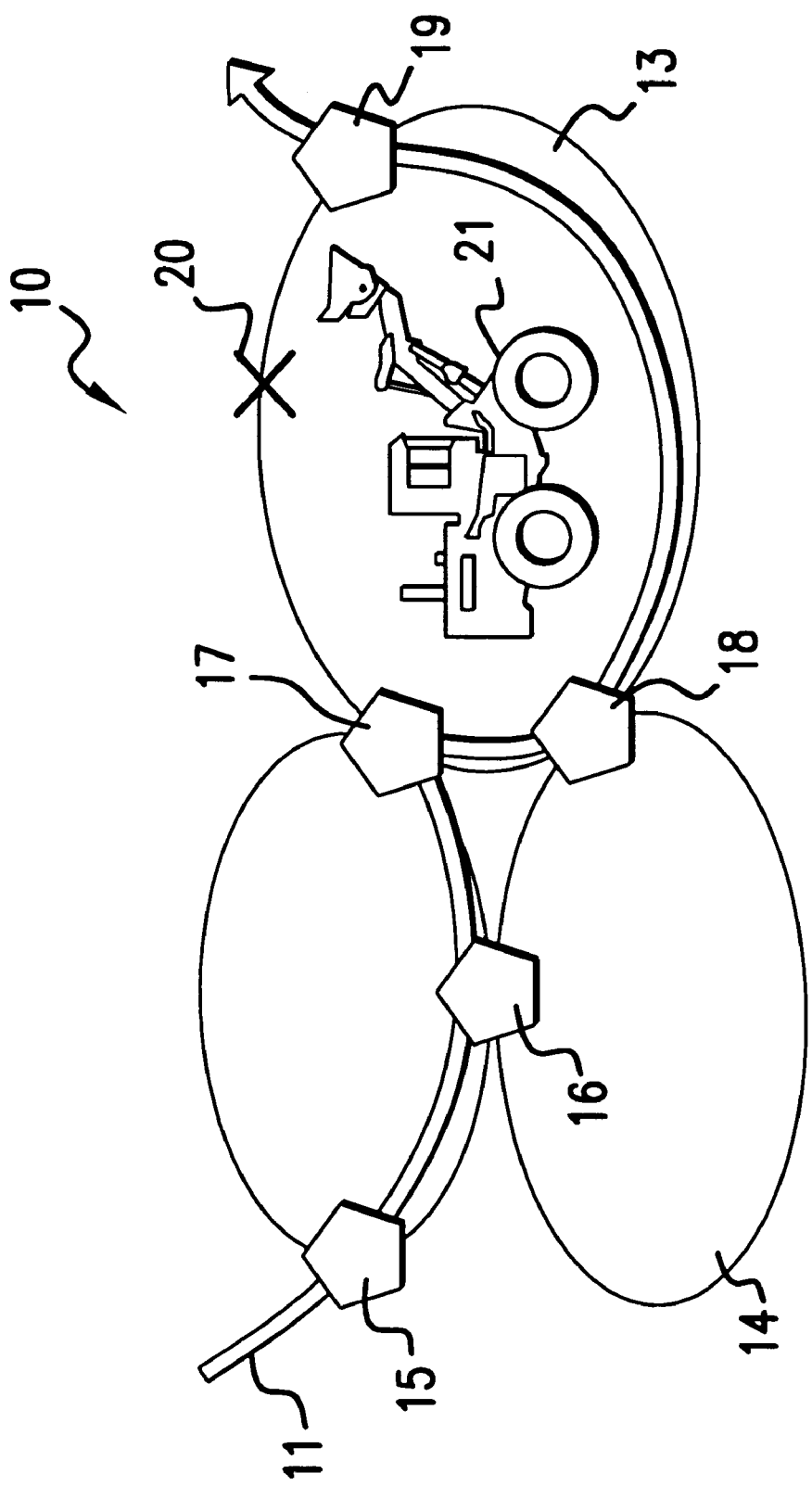
FIG. 2 shows a diagram of communication traffic after restoration in a communication network.
Figure 3:
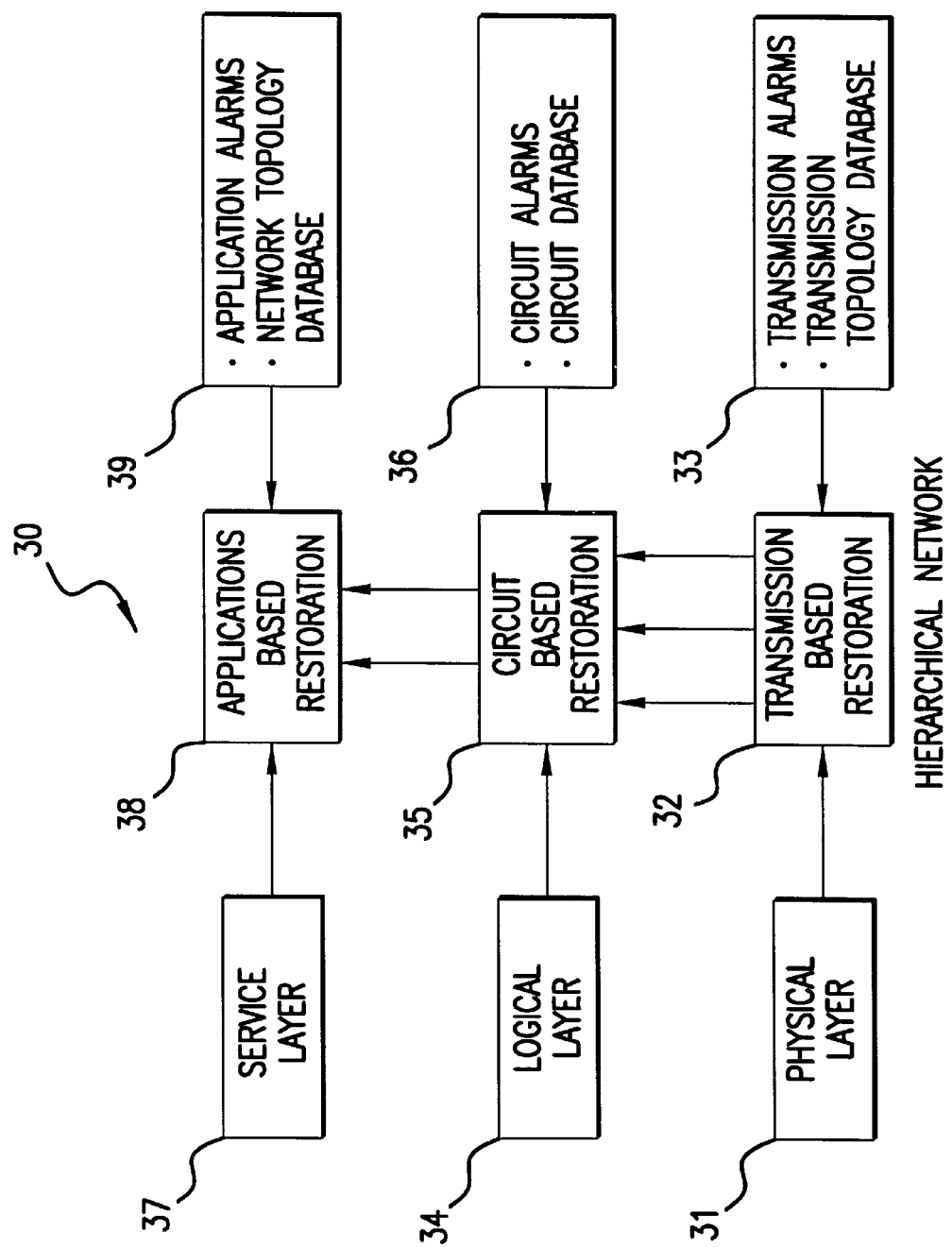
FIG. 3 shows a network model of a typical multi-layer restoration process for a communication network.
Figure 4A:
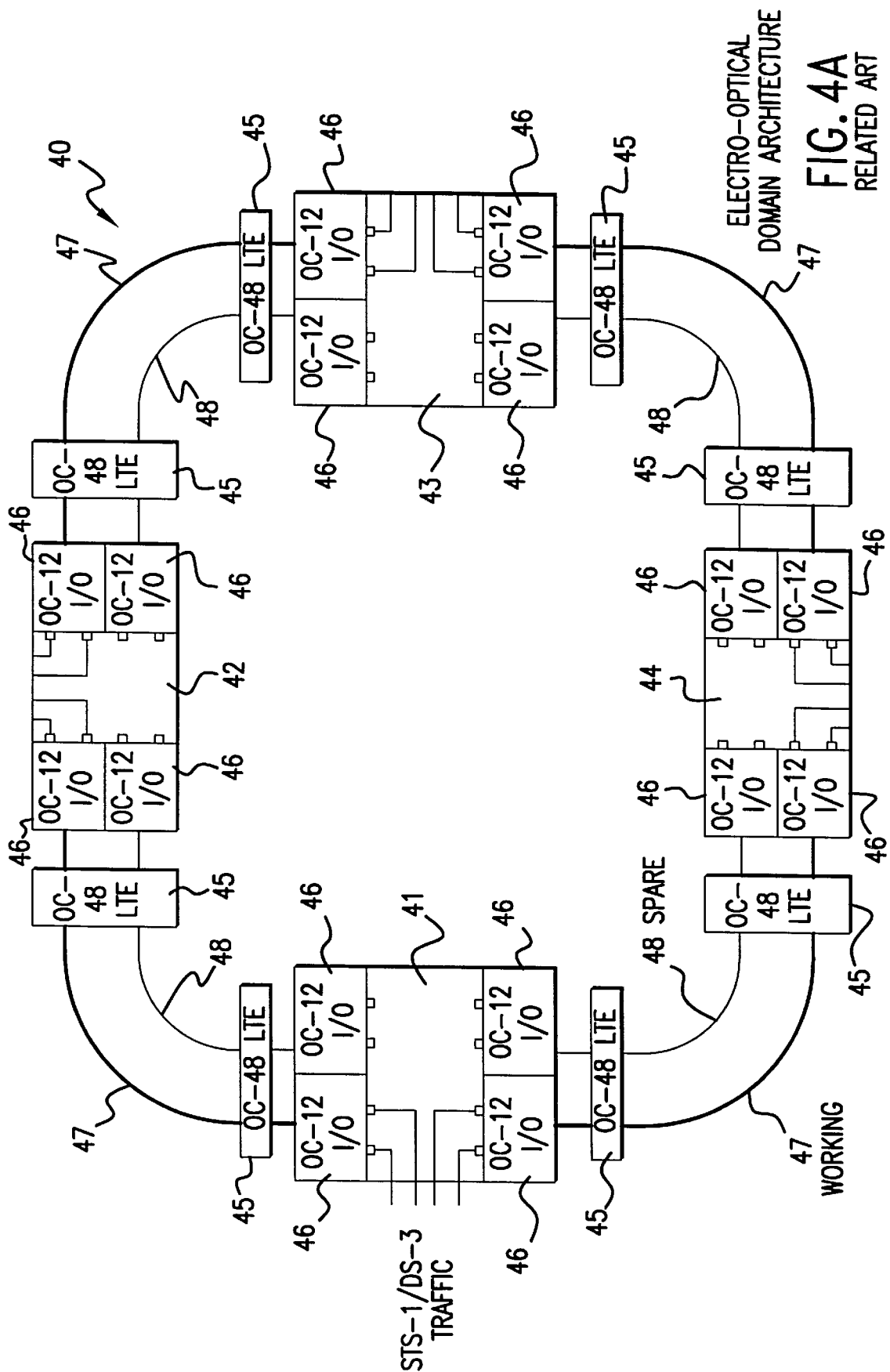
FIG. 4A shows a schematic block diagram of a conventional broadband electrical cross-connect domain of a communication network in a normal mode of operation.
Figure 4B:
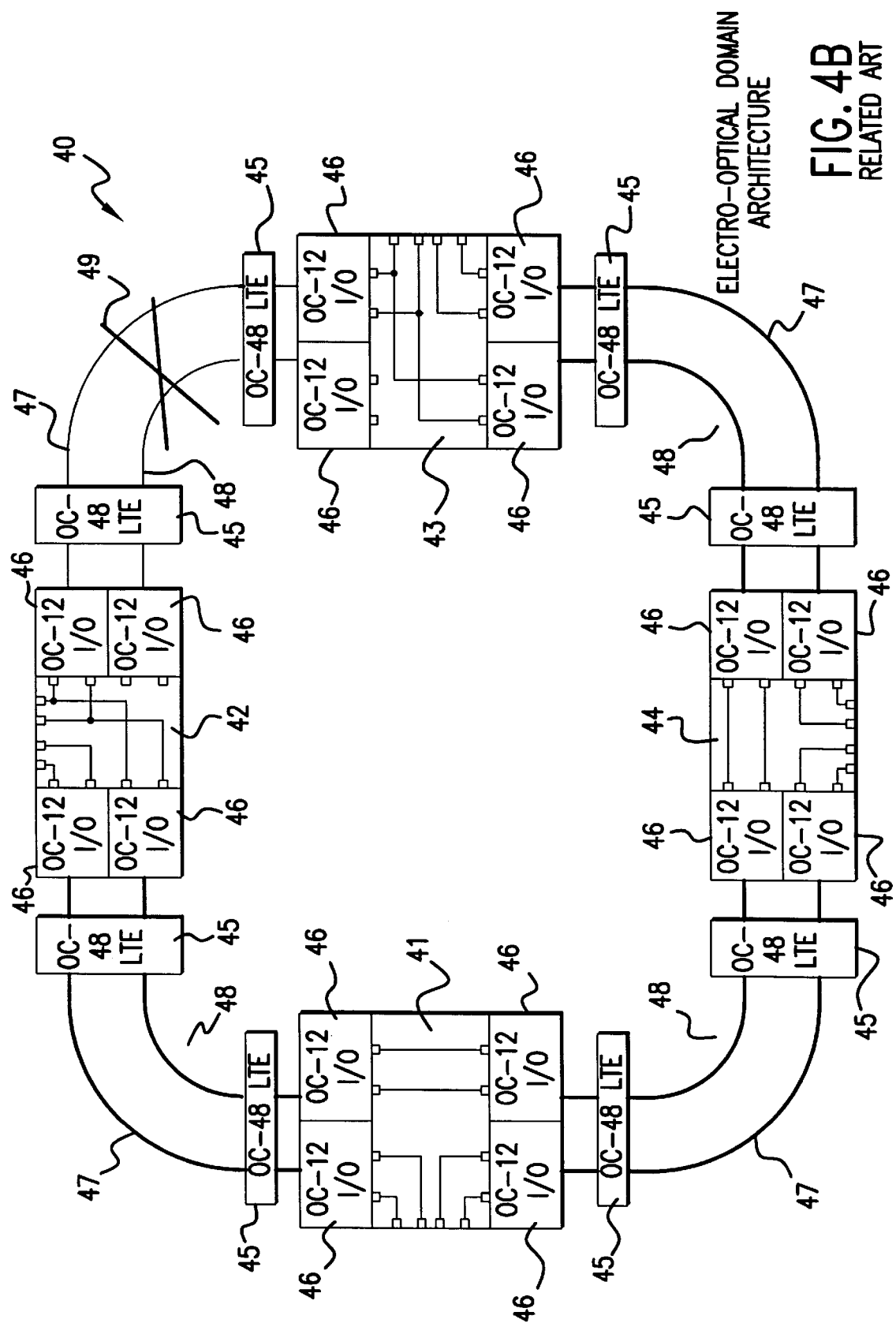
FIG. 4B shows a schematic block diagram of a conventional broadband electrical cross-connect domain of a communication network during a restoration mode of operation.
Figure 5A:
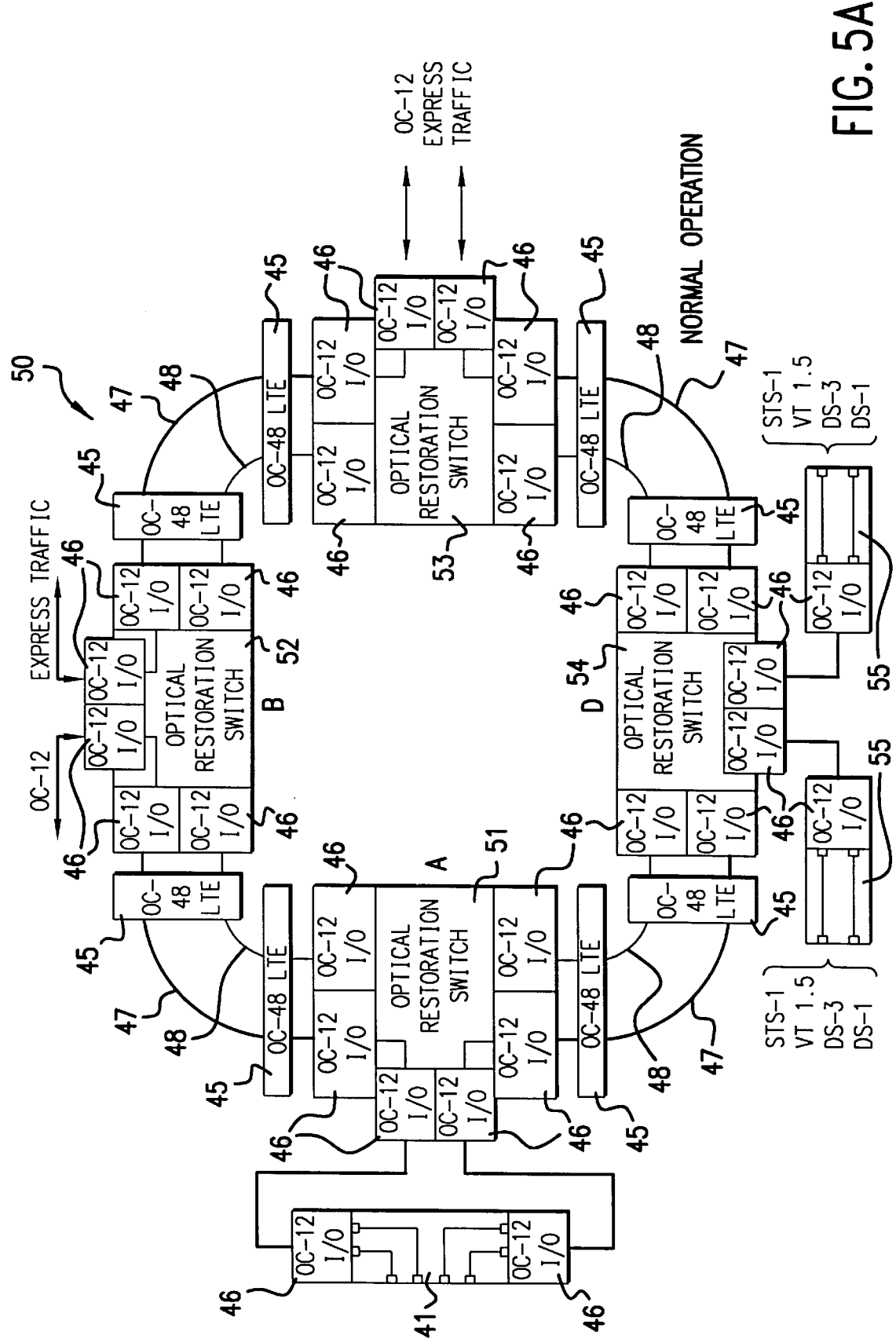
FIG. 5A shows a schematic block diagram of a first embodiment of a system for restoring an optical domain according to the present invention in a normal mode of operation.

FIG. 5A shows a schematic block diagram of a first embodiment of an optical domain restoration (ODR) system 50 according to the present invention. FIG. 5A shows an exemplary four node or gateway domain having four optical switch platforms 51–54 at nodes A to D respectively. Each optical switch platform 51–54 is connected to a high-speed OC-48 transport line or light-wave terminal element (LTE) 45 via OC-12 optical connections 46 for transmitting communication information bi-directionally around outside optical pipe ring 47 and inside optical pipe ring 48.

Traffic can enter the ODR system 50 in a variety of ways. Any network element equipped with an appropriate optical interface can be connected to the gateways of the domain. Gateway cross-connects or any type of optical signal input device, such as a multiplexer or electrical to optical signal converter can be connected to optical switch platforms 51–54. Express optical traffic can also be conducted.

The variety of domain inputs and flexibility of ODR system 50 is illustrated in the example of FIG. 5A. Optical switch platform 51 is connected to the SONET Broadband DACS 41 for multiplexing/de-multiplexing STS1/DS-3 type traffic into OC-12 data signals. Optical switch platforms 52 and 53 are each connected to transport OC-12 express traffic. Optical switch platform 54 is connected to OC-12 transport bandwidth management (TBM) shelves 55, such as that shown connected to optical switch platform 54, for receiving any type of data communication signal, such as STS-1, VT-1, DS-3, DS-1, and/or DS-0 services.

Under normal conditions, communication traffic is carried on outside optical pipe ring 47, also called a working or higher-priority optical pipe ring. Inside optical pipe ring 48, also called a spare or lower-priority optical pipe ring, includes dedicated spare capacity held in reserve for restoration.

Figure 5B:
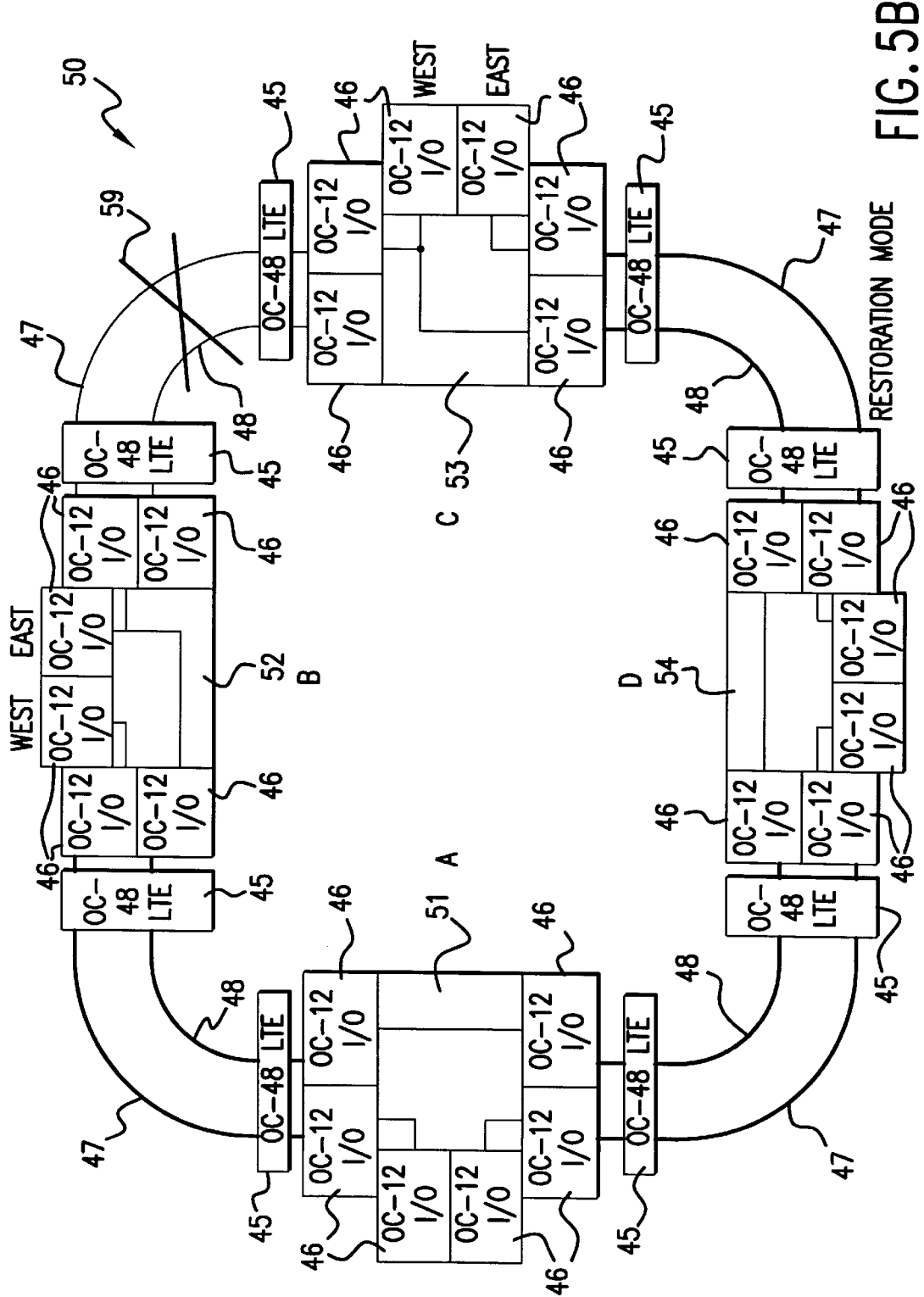
FIG. 5B shows a schematic block diagram of the first embodiment of a system for restoring an optical domain according to the present invention in a restoration mode of operation.

FIG. 5B illustrates how communication traffic is rerouted on the inside ring 48 of ODR system 50 in the event of a fiber cut 59 according to the present invention. East and West traffic through a network including the four nodes A to D is described for illustrating the ODR of the present invention. Of course, the present invention is not limited to a particular traffic direction, destination, and/or geography.

The fiber cut 59 impairs or severs East-West traffic along the working optical ring 47, and possibly the spare optical ring 48 as well, between nodes B and C. In response to the fiber cut, optical restoration switch 52 at node B switches East traffic, which would otherwise be sent to node C over the working pipe ring 47, to be sent over the spare pipe ring 48 in the opposite direction towards node A. Similarly, optical restoration switch 53 at node C switches West traffic, which would otherwise be sent to node B over the working pipe ring 47, to be sent over the spare pipe ring 48 in the opposite direction toward node D.

Thus, in the optical domain restoration of the present invention, traffic is re-routed through optical switching instead of the electrical bypass associated with the conventional electrical domain restoration. The optical domain restoration switch platforms 51-54 are inserted between electrical cross-connect elements of the respective gateways and the domain. Consequently, the restoration path does not require knowledge of the type or the number of circuits contained within the optical pipes of the domain. Express traffic within a domain can flow through and be restored within a domain by ODR system 50 without breaking the traffic down in an electrical cross-connect. Spare capacity at nodes 51–54 which is not affected by fiber cut 59 can be used as a bypass.

The OC-48 transport LTEs 45 of ODR system 50 are each configured for determining what communication signals are contained in the optical restoration pipe 48 during the restoration mode and for automatically assigning sufficient bandwidth for carrying traffic around restoration ring 48. If the OC-48 transport LTEs 45 are not so configured, each node 51–54 would be required to be configured by instructions prior to traffic restoration, thus increasing the network management overhead of the network. This would require a circuit database equal in size and complexity to the database required for a logical layer circuit-base restoration process.

Since the present invention is a transmission-based restoration process, transmission alarms are used to activate the restoration process. Optical receivers in the optical switch platforms detect the presence or absence of light in the working and/or spare optical pipe rings. Mediation devices at each node then monitor SONET overhead. Mediation devices further generate alarms when the optical receivers detect a "loss of light" condition caused, for example, by an optical cable cut. Considering that a SONET OC-48 system has 48 circuits, a circuit-based restoration approach must analyze and process a total of 48 circuit alarms for every one "loss of light" alarm analyzed and processed by the present invention. Therefore, conclusions drawn by the analysis and processing of the present invention requires a fraction, i.e. only 2% in this example, of the total information needed by a circuit-based restoration for determining that a fiber cut has occurred.

Optical Switching Platform

Figure 6:
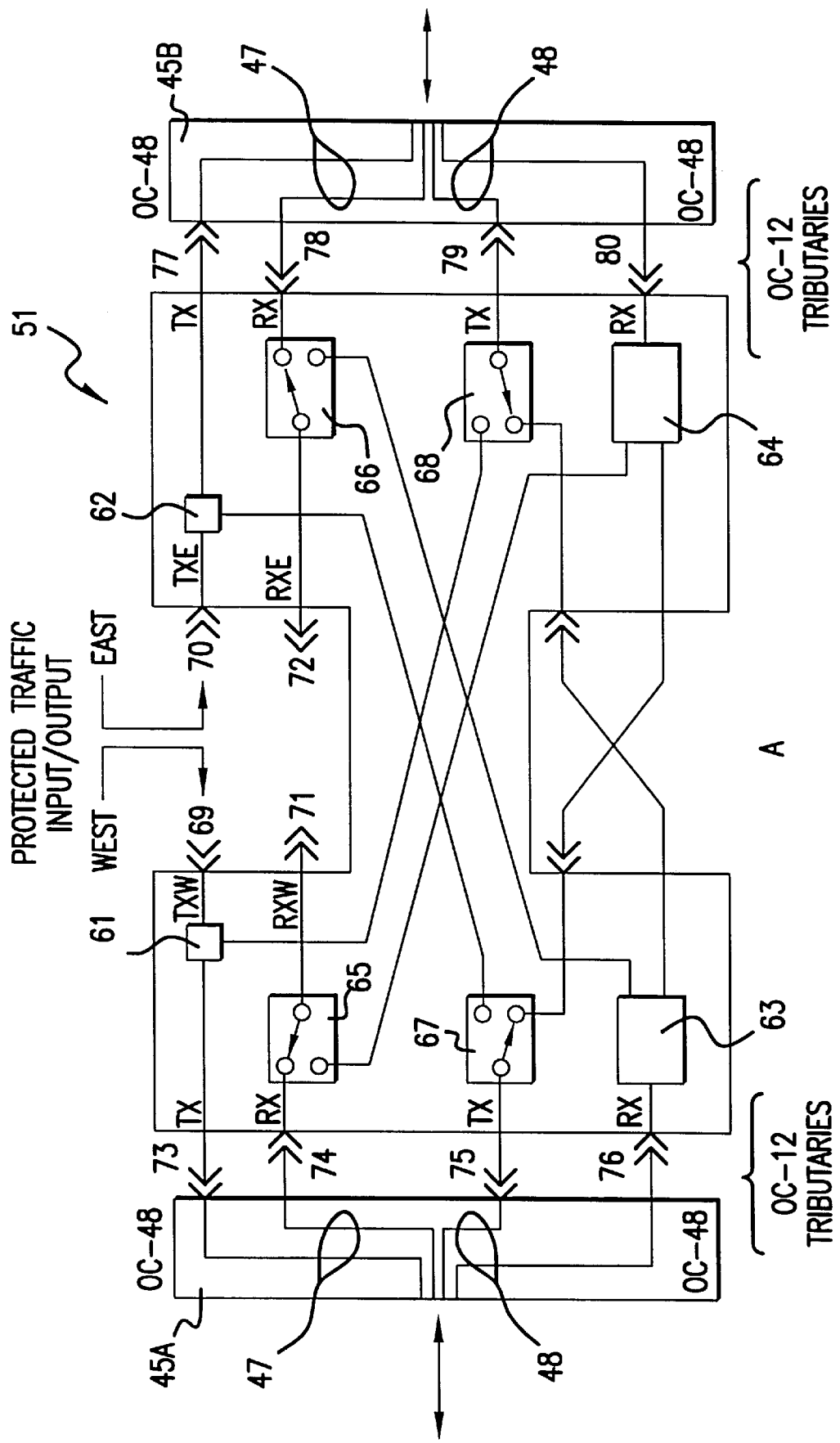
FIG. 6 shows a schematic block diagram of a module for an optical switch platform according to the present invention.

FIG. 6 shows a schematic block diagram of a module of an optical switch platform, for example, optical switch platform 51 of FIG. 5A according to the present invention. The module shown in FIG. 6 includes optical splitters 61–64 and optical switches 65–68 interconnected through optical waveguides for effecting an optical by-pass. The components comprising optical switch platform 51 are preferably packaged as a module of approximately 6 inches by 15 inches in size. Integrated and/or discrete optical components can be used.

An example of the traffic flow through the optical switch platform 51 will now be described. For clarity, the traffic flow is described in terms of East and West traffic flow through the network.

West communication traffic output from a gateway cross-connect (not shown) is input at module input 69 and directed to an input of optical splitter 61. One output of splitter 61 is connected to an input of optical switch 68. The other output of splitter 61 is directed to module output 73. East communication traffic output from a gateway cross-connect is input at module input 70 and directed to one input of optical splitter 62. One output of splitter 62 is connected to an input of optical switch 67. The output of splitter 62 is directed to module output 77. Module outputs 73 and 77 are each an OC-12 tributary coupled to OC-48 transport LTE 45A and 45B, respectively.

West communication traffic received at module input 74 is directed to one input of optical switch 65. The other input of switch 65 is connected to one output of optical splitter 64. The output of switch 65 is connected to module output 71 for output to the cross-connect of the gateway. Similarly, East communication traffic received at module input 78 is directed to one input of optical switch 66. The other input of switch 66 is connected to one output of optical splitter 63. The output of switch 66 is connected to module output 72 for output to the gateway cross-connect.

The second input of switch 67 is connected to the second output of splitter 64, while the output of switch 67 is connected to module output 75. The input of splitter 64 is connected to module input 80. The second input of switch 68 is connected to a second output of splitter 63. Module outputs 73 and 75, and inputs 74 and 76 are connected to OC-48 transport LTE 45A. Module outputs 77 and 79, and inputs 78 and 80 are connected to OC-48 transport LTE 45B.

When optical switching platform 51 is in a normal mode of operation, West communication traffic to be transmitted through the domain in the working pipe ring 47 is directed from module input 69 through splitter 61 to module output 73 to LTE 45A. The optical path from splitter 61 to module output 79 is broken by the configuration of switch 68 in the normal mode as shown. West traffic received at module input 74 is directed to module output 71 by the configuration of switch 65 in the normal mode.

East communication traffic for transmission through the working pipe ring 47 is directed from module input 70 through splitter 62 to module output 77. East communication received at module input 78 is directed through switch 66 to module output 72 for output to the cross-connect of the gateway.

With regards to traffic through the spare optical pipe ring 48, switches 67 and 68 and splitters 63 and 64 are configured for passing communication traffic straight through the node A between module input 80 and output 75, and module input 76 and output 79 as shown.

In the situation where there is a cable cut to the left of LTE 45A (not shown), optical switching platform 51 will be reconfigured for restoration. In the restoration mode, switch 68 directs West communication traffic to module output 79 for transmission through the inner spare ring 48 of the domain. Switch 65 directs communication traffic which has been rerouted from module input 80 to module output 71. If there is a cut (not shown) in the optical fiber cable to the right of LTE 45B, switches 66 and 67 will be configured to route East communication traffic into the inner optical pipe ring 48 of the domain in a manner similar to that described for the a fiber cable cut affecting West communication traffic. With platform 51 configured in this way during the restoration mode, the associated gateway cross-connect is not required to be involved with the restoration process.

The principles of ODR according to the present invention are not limited by the specific implementation shown in FIG. 6. For example, the splitters 61–64 can be replaced by optical switches to provide more flexible control and reduce optical loss. In general, given the above description, different arrangements of the optical switches, splitters, and waveguides described above, including fewer or more of these components, and different types of optical components, e.g., lenses, gratings, beam splitters, reflectors, quantum-well switches, beam stops, optical amplifiers, line repeaters, etc., can be used depending upon a particular application.

Preemptive Traffic

Figure 7:
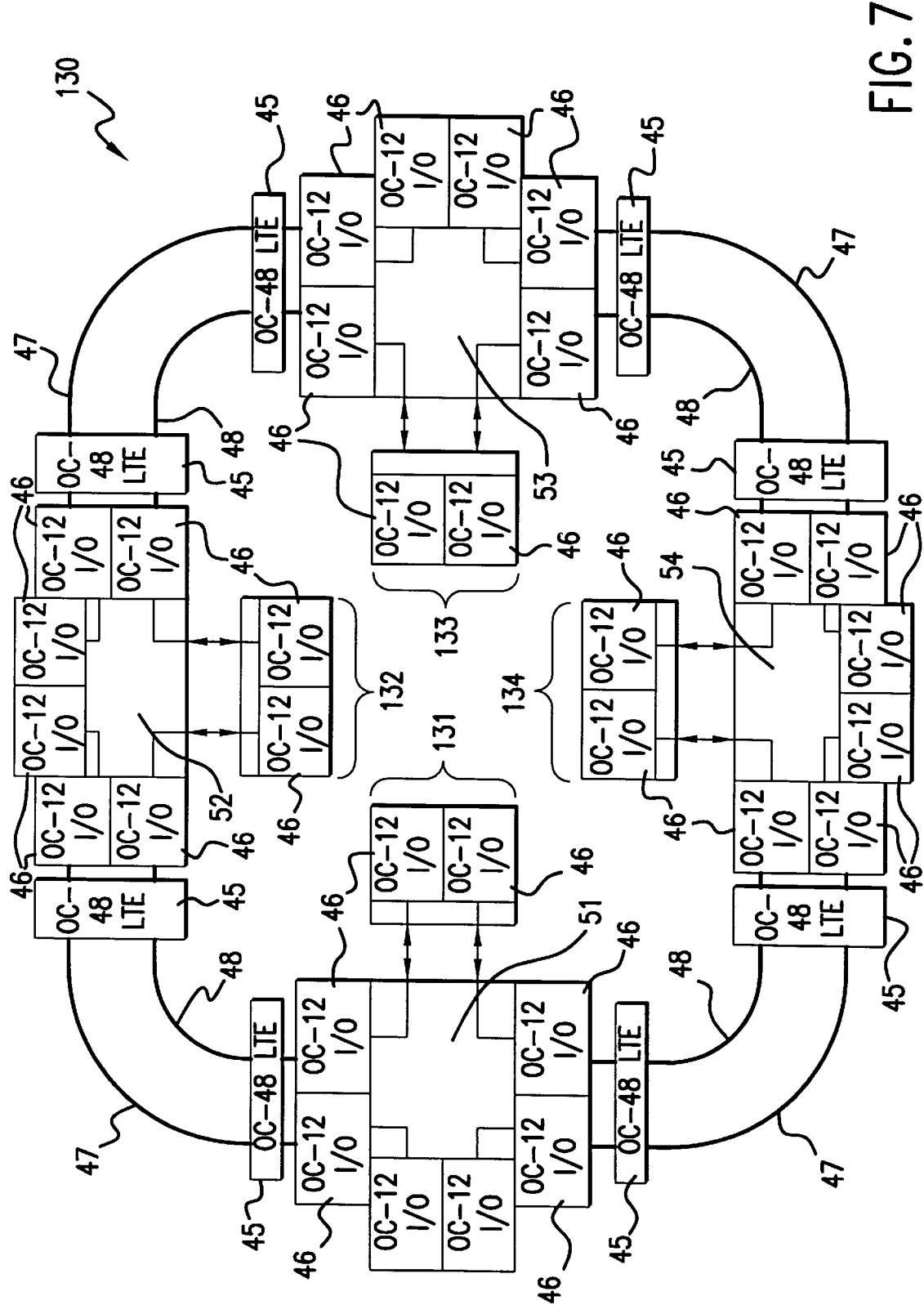
FIG. 7 shows a schematic block diagram of a second embodiment of a system for passing preemptive traffic and restoring an optical domain according to the present invention.

FIG. 7 shows a schematic block diagram of a second embodiment of an ODR system 130 according to the present invention that allows up to 100% of the dedicated spare capacity of a domain to be utilized when the domain is not in a restoration mode. To achieve this, low priority communication traffic, referred to as "preemptive traffic," is routed through inside optical pipe ring 48 by preemptive traffic input modules 131–134 located at each of the gateways of domain system 130. Preemptive traffic input modules 131–134 each receive optical communication traffic at the gateways and route bi-direction preemptive traffic through the spare ring 48.

The preemptive traffic is automatically dropped by the ODR system 130 in favor of the higher priority communication traffic normally carried in optical pipe ring 47 when a fiber cut occurs. Several uses for preemptive traffic include the utilization of a small number of circuits for circuit- or application-based restoration. Using this approach, dedicated spare capacity in domains that have not been affected by a specific fiber cut could serve a dual role as both transmission-based, and circuit-based restoration capacity.

Preemptive Traffic Interface and Input

Figure 8:
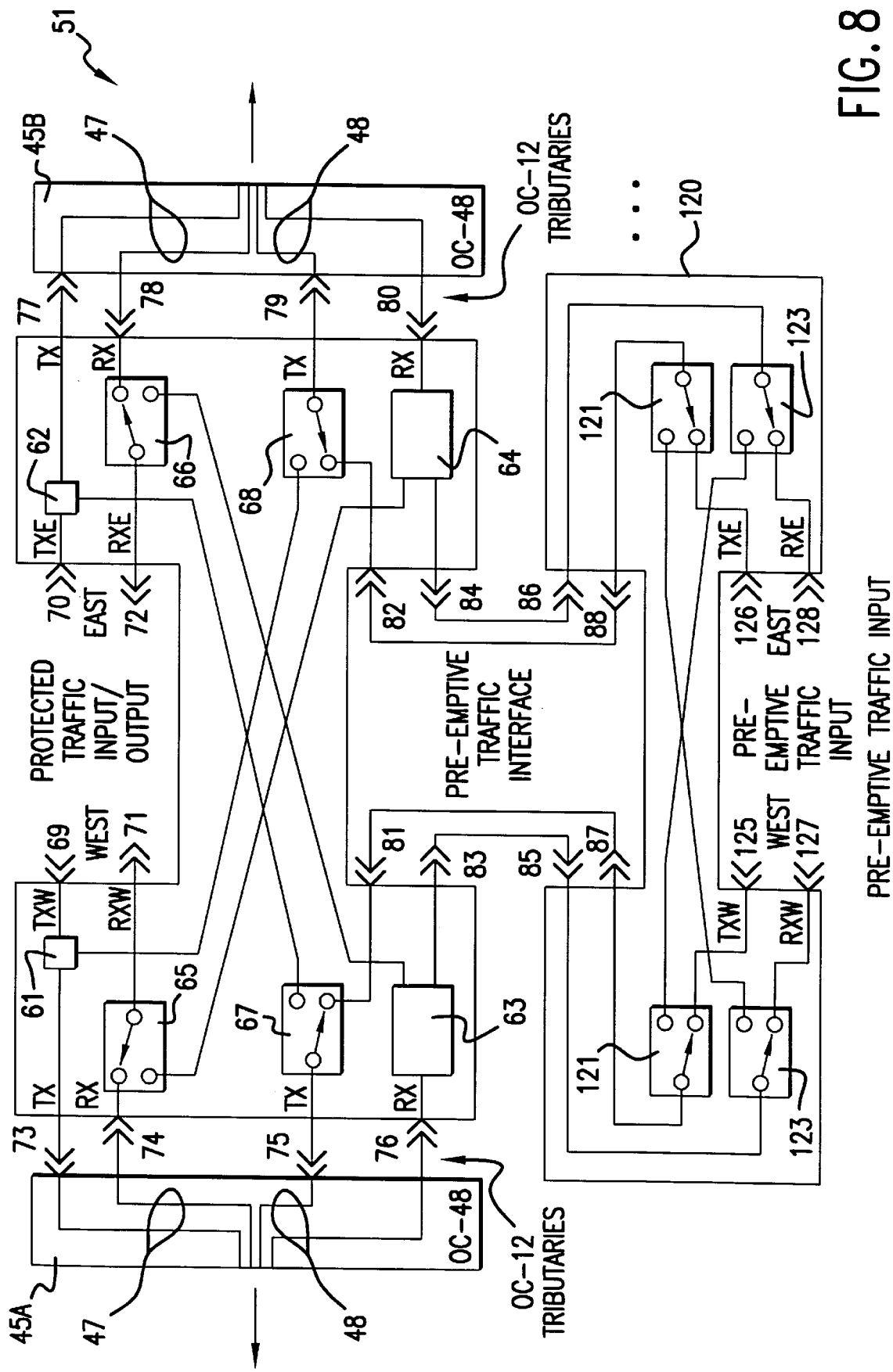
FIG. 8 shows a schematic block diagram of a module of an optical switch platform having a preemptive traffic interface according to the present invention.

FIG. 8 shows a schematic block diagram of a module of an optical switch platform having a preemptive traffic interface according to a second embodiment of the present invention. The second embodiment includes an optical switching platform 51, as described with respect to FIG. 6, coupled to a preemptive traffic module 120. Ports 81, 83, 82, and 84 of the optical switching platform 51 are coupled to ports 85, 87, 88, and 86 respectively in the preemptive traffic module 120.

Preemptive traffic module 120 includes optical switches 121–124. Optical switches 121–124 are connected for transmitting and receiving preemptive traffic through ports 125–128, respectively. For example, preemptive traffic can be forwarded to and from a gateway cross-connect (or other input device) when the domain is operating in a normal mode, as shown in FIG. 8. During restoration, optical switches 121–124 are switched to opposite states from that shown in FIG. 8 which drops the preemptive traffic in favor of higher priority protected traffic re-routed around a fiber cut or other failure.

In particular, during normal operation West input preemptive traffic enters port 125, travels through optical switch 121, exits port 87, enters port 81, and passes through switch 67 and module output 75 for West transmission over spare optical pipe ring 48. East input preemptive traffic enters port 126, travels through optical switch 122, exits port 88, enters port 82, and passes through switch 68 and module output 79 for East transmission over spare optical pipe ring 48. West output preemptive traffic passes from spare optical pipe ring 48 to module input 76, passes through optical splitter 63 to port 83, enters port 85, and passes through optical switch 123 to port 127. East output preemptive traffic passes from spare optical pipe ring 48 to module input 80, passes through optical splitter 64 to port 84, enters port 86, and passes through optical switch 124 to port 128.

During restoration, optical switches 121 to 124 are switched to opposite states from that shown in FIG. 8 to bypass the pre-emptive traffic ports 125–128. Thus, a first optical path is formed between ports 85 and 88 through optical switches 123 and 122. A second optical path is formed between ports 86 and 87 through optical switches 124 and 121.

Moltiple Domain Switch

Figure 9:
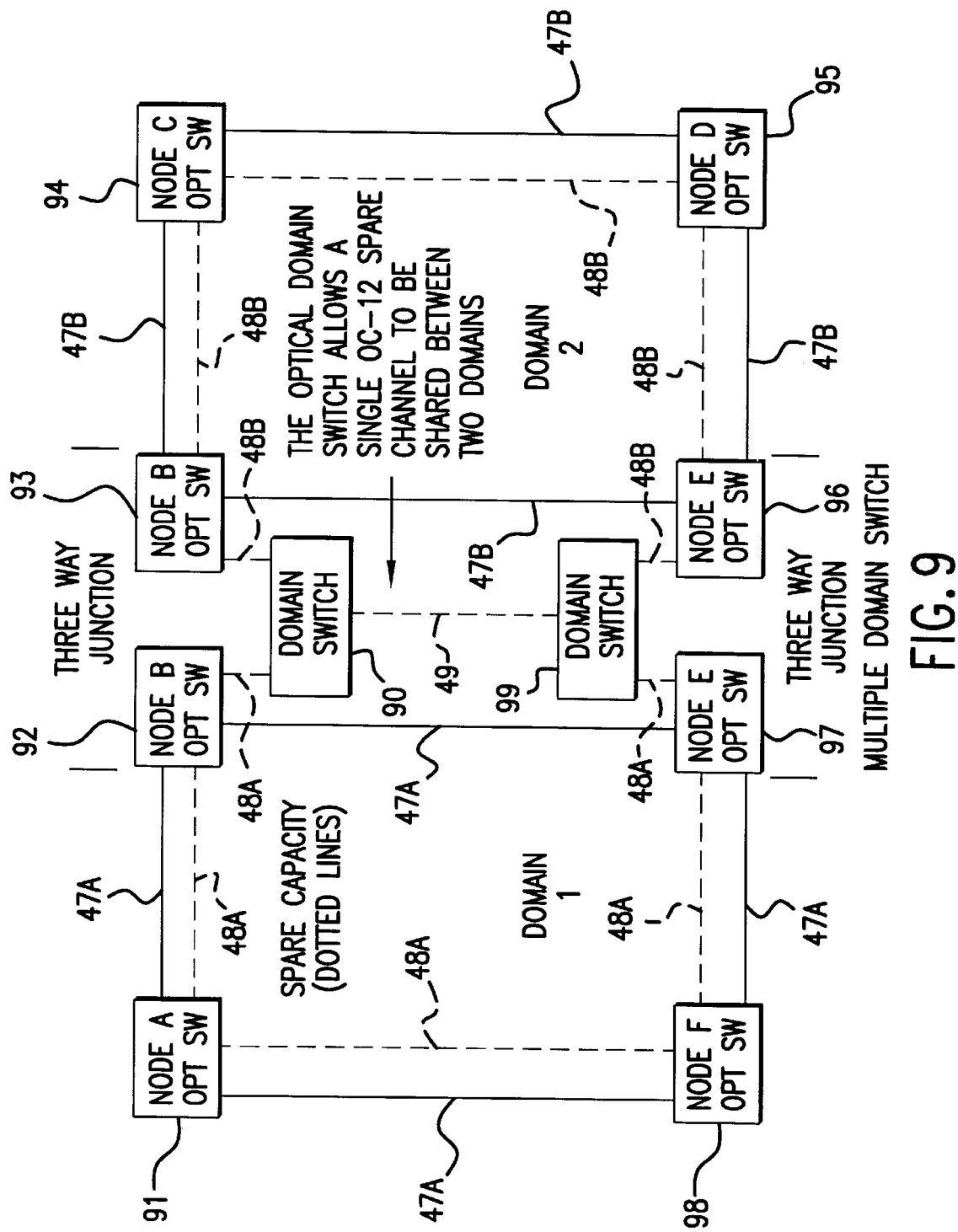
FIG. 9 shows a schematic block diagram of a system for restoring adjacent optical domains according to the present invention.

FIG. 9 shows a further aspect of the present invention allowing a common restoration path to be shared between adjacent domains 1 and 2 in a communications network. Using a common restoration path increases utilization of spare capacity and produces installation, equipment and maintenance savings, especially for long-distance links. Moreover, it is reasonable to assume that only one of the adjacent domains at time is likely to suffer a fiber cut.

Six nodes A to F are shown for purposes of illustration in FIG. 9. The nodes A to F include respective optical switching platforms 91 to 98 as described earlier with respect to FIGS. 5–6. Nodes A, B, E, and F lie in domain 1. Nodes B, C, D, and E lie in domain 2.

Nodes B and E each form a three-way optical junction. Node B has two optical switching platforms 92, 93 coupled to an optical domain switch 90 for routing traffic from either domain 1 and 2 along the common restoration path 49. Node E has two optical switching platforms 96, 97 coupled to an optical domain switch 99 for routing traffic from either domain 1 and 2 along the common restoration path 49. Optical domain switches 90 and 99 can be simple 2×1 optical switches (integrated or non-integrated). Other types of optical switches and optical components (e.g. waveguide couplers, splitters) can be substituted or added.

Working and spare optical pipe rings are provided for each optical domain 1, 2 as indicated by the respective solid and dashed lines. Optical domain 1 has a working optical pipe ring 47A. Optical domain 2 has a working optical pipe ring 47B. Nodes B and E share a common optical fiber segment 49 used as a common restoration path for both optical domains. Thus, the spare optical pipe ring for optical domain 1 includes segments 48A and 49. The spare optical pipe ring for optical domain 2 includes segments 48B and 49.

The optical switching platforms 91 to 98 switch traffic between the working and spare rings within a corresponding domain as described earlier with respect to FIGS. 5–6 and need not be described in further detail. During optical domain restoration, domain switches 90 and 99 are switched to direct restoration along the common fiber segment 49 between nodes B and E. For example, when a fiber cut has occurred in domain 1 between nodes A and B, optical switching platform 92 switches traffic headed for Node A over the working pipe 47A to the spare optical ring 48A in the direction of node E. Domain switches 90 and 99 are switched to form a restoration path including fiber segments 48A and 49 between nodes B and E. Depending upon the location of a fiber cut, the other optical switching platforms 93, 96, and 97 at nodes B and E similarly act in restoration mode to direct traffic through the common fiber segment 49.

Central ODR Management

Figure 10A:
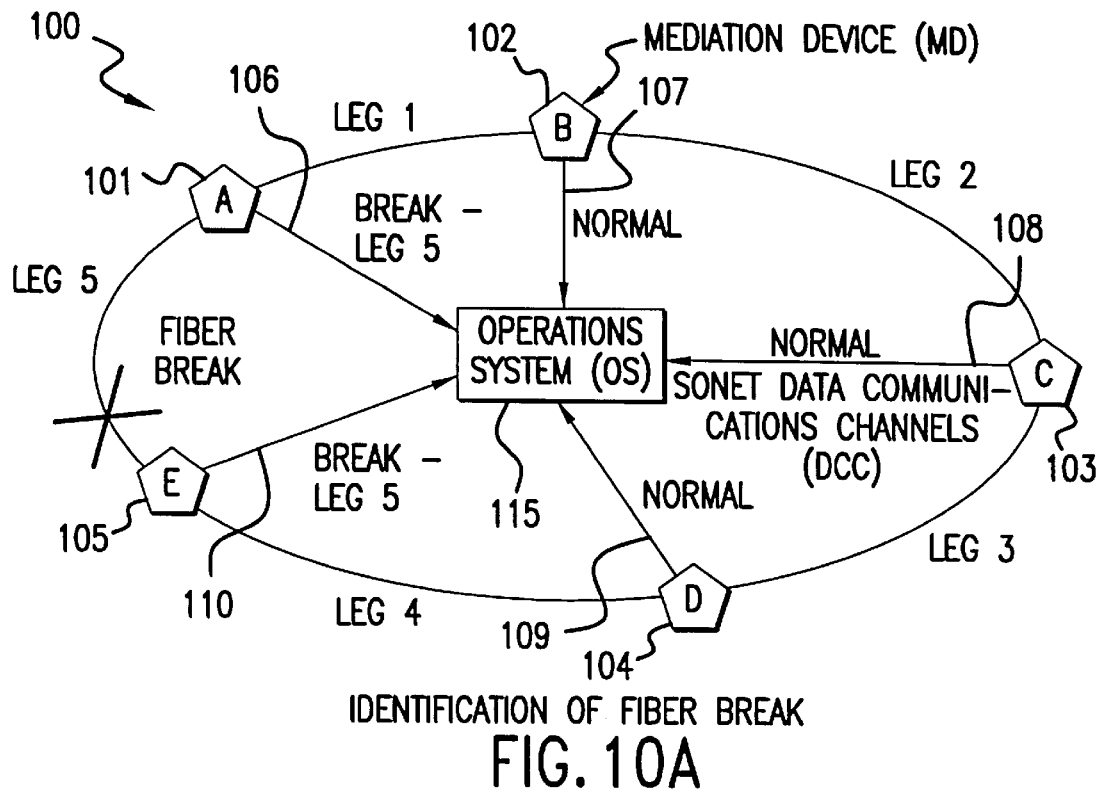
FIGS. 10A and 10B show schematic block diagrams of an optical domain restoration (ODR) management system according to the present invention.
Figure 10B:
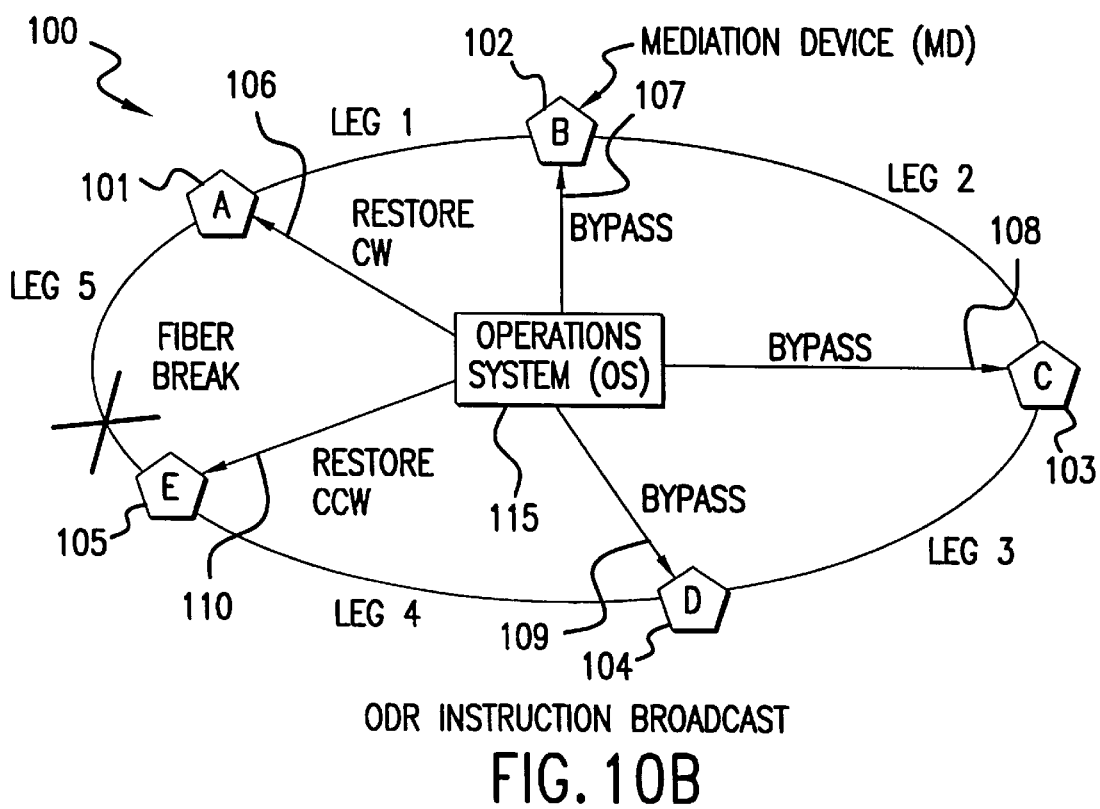

FIGS. 10A and 10B show a schematic block diagram of an optical domain restoration (ODR) management system 100 according to the present invention for a five node or gateway domain (Nodes A to E). FIG. 10A shows node communications for identifying a fiber break to a central ODR operation system (OS) 115. FIG. 10B shows the subsequent restoration instructions broadcast by the ODR operation system (OS) 115 to the nodes A to E in response to the identified fiber break.

The five nodes A to E are interconnected as gateways in a ring configuration through working and spare optical pipe rings as described above. For clarity of illustration, the inter-nodal working and spare fiber links are represented at a high-level by leg segments (Legs 1 to 5). Leg 1 spans between nodes A and B, Leg 2 spans nodes B and C, Leg 3 spans nodes C and D, Leg 4 spans nodes D and E, and Leg 5 spans nodes E and A. Optical switching platforms (not shown) are also included at each node A to E for switching traffic between working and spare optical rings as described above.

Figure 11:
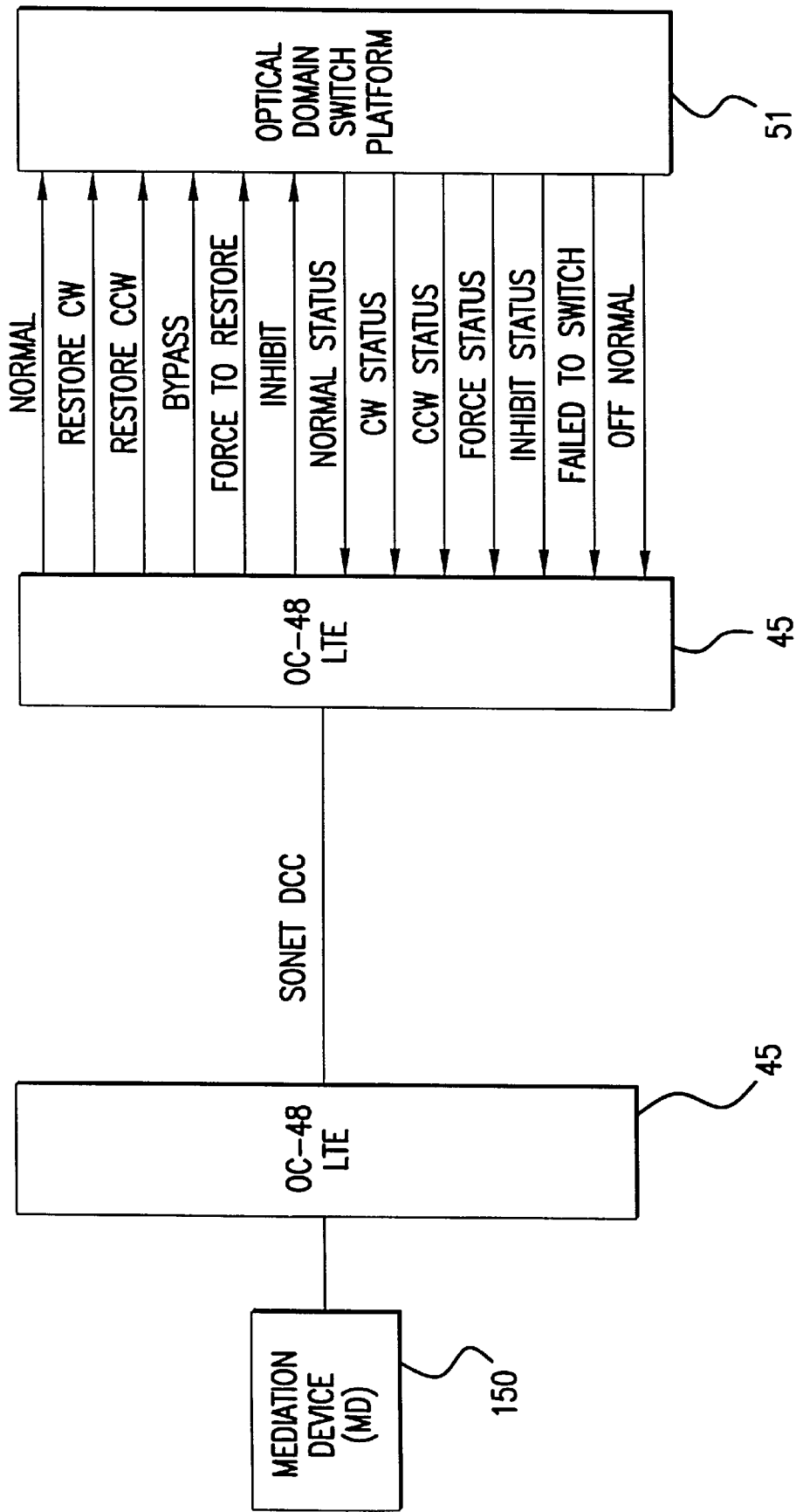
FIG. 11 shows a telemetry interface diagram for restoring an optical domain according to the present invention.

Nodes A to E each further include a respective mediation device (MD) 101–105. These mediation devices 101–105 monitor the SONET overhead of traffic in each direction served by a node and are connected in the nodes to the OC-48 LTE 45. See, e.g., the mediation device 150 in FIG. 11.

Each mediation device 101–105 communicates with the central ODR operation system 115 through communication links 106–110, respectively. For example, these separate communication links 106–110 can represent a separate, highly-reliable communication network, e.g., an X.25 data network carrying SONET Data Communication Channels (DCCs). The present invention uses the inherent characteristics of SONET transport systems, including operations communications routing and LAN support. A suitable publication describing these characteristics in detail is the Bellcore publication TA-NWT-000253, which is hereby incorporated by reference. The SONET DCCs are highly survivable because they are structured in domains identical to those used in a high survivability network architecture.

As shown in FIG. 10A, when a fiber break occurs in Leg 5, for example, each optical switch platform of the present invention at gateway nodes A and E detects a loss of light condition. The respective mediation devices 101 and 105 relay "Break Alarms" communicating the loss of light condition information to the central ODR operations system 115 via links 106 and 110, respectively. MDs 102–104 can continue to communicate "Normal" status messages over respective links 107–109.

ODR operations system 115 includes a memory having a restoration state table containing configuration instructions or commands for each gateway node A to E in the domain. In response to receiving loss of light condition information, i.e. "Break Alarms," ODR operation system 115 sends configuration instructions to affected nodes for restoring the broken communication link. Table I below sets forth an exemplary restoration state table for ODR system 100 according to the present invention.

TABLE I

| FIBER BREAK | NODE A | NODE B | NODE C | NODE D | NODE B |
|---|---|---|---|---|---|
| LBG 1 | RESTORE CCW | RESTORE CW | BYPASS | BYPASS | BYPASS |
| LEG 2 | BYPASS | RESTORE CCW | RESTORE CW | BYPASS | BYPASS |
| LEG 3 | BYPASS | BYPASS | RESTORE CCW | RESTORE CW | BYPASS |
| LEG 4 | BYPASS | BYPASS | BYPASS | RESTORE CCW | RESTORE CW |
| LEG 5 | RESTORE CW | BYPASS | BYPASS | BYPASS | RESTORE CCW |

Table I shows that only three different instructions or commands are required for effecting optical restoration according to the present invention. These commands are: Restore Clockwise (CW), Restore Counter-Clockwise (CCW) and Bypass. Restore Clockwise commands instruct an optical switching platform to switch traffic from heading counter-clockwise (e.g. West) over a working optical pipe ring to heading clockwise (e.g. East) over a spare optical pipe ring. Conversely, Restore Counter-Clockwise commands instruct an optical switching platform to switch traffic from heading clockwise (e.g. East) over a working optical pipe ring to heading counter-clockwise (e.g. West) over a spare optical pipe ring. Bypass commands instruct an optical switching platform to pass traffic traveling in the spare optical pipe ring through the node. This can have the effect of dropping pre-emptive traffic, if any.

For example, when Break Alarms signaling a fiber break in leg 5 are received at the ODR operation system 115, the ODR system 115 identifies appropriate ODR commands through the restoration state table of Table I. In particular, the entry for leg 5 is read which contains a Restore CW configuration instruction for gateway node A, a Restore CCW configuration instruction for gateway node E, and Bypass instructions for gateway nodes B to D. The ODR configuration commands are sent over the respective communication links 106–110 to the mediation devices 101–105 (or other separate functional processors).

Upon receipt of the Restore CW configuration instruction, an optical switching platform in node A, as described above, reroutes communication traffic previously routed in a counter-clockwise direction over a working pipe ring between nodes A and E in a clockwise direction over a spare optical pipe ring from node A to node B. Similarly, upon receipt of the Restore CCW command, an optical switching platform in node E reroutes communication traffic previously routed in a clockwise direction over a working optical pipe ring between node E and node A in a counterclockwise direction over a spare working optical pipe from node E to node D. Optical switching platforms receiving Bypass commands pass traffic carried in the spare optical ring straight through each of the node B to D.

In addition to the restoration configuration instructions, the ODR operations system 115 can instruct each node to assume surrogate performance monitoring for communication traffic affected by fiber cut 107.

ODR Telemetry Interface

Since the optical switch platforms of the present invention do not require an internal processor, the optical switch platforms retain a simplicity of design.

Figure 12:
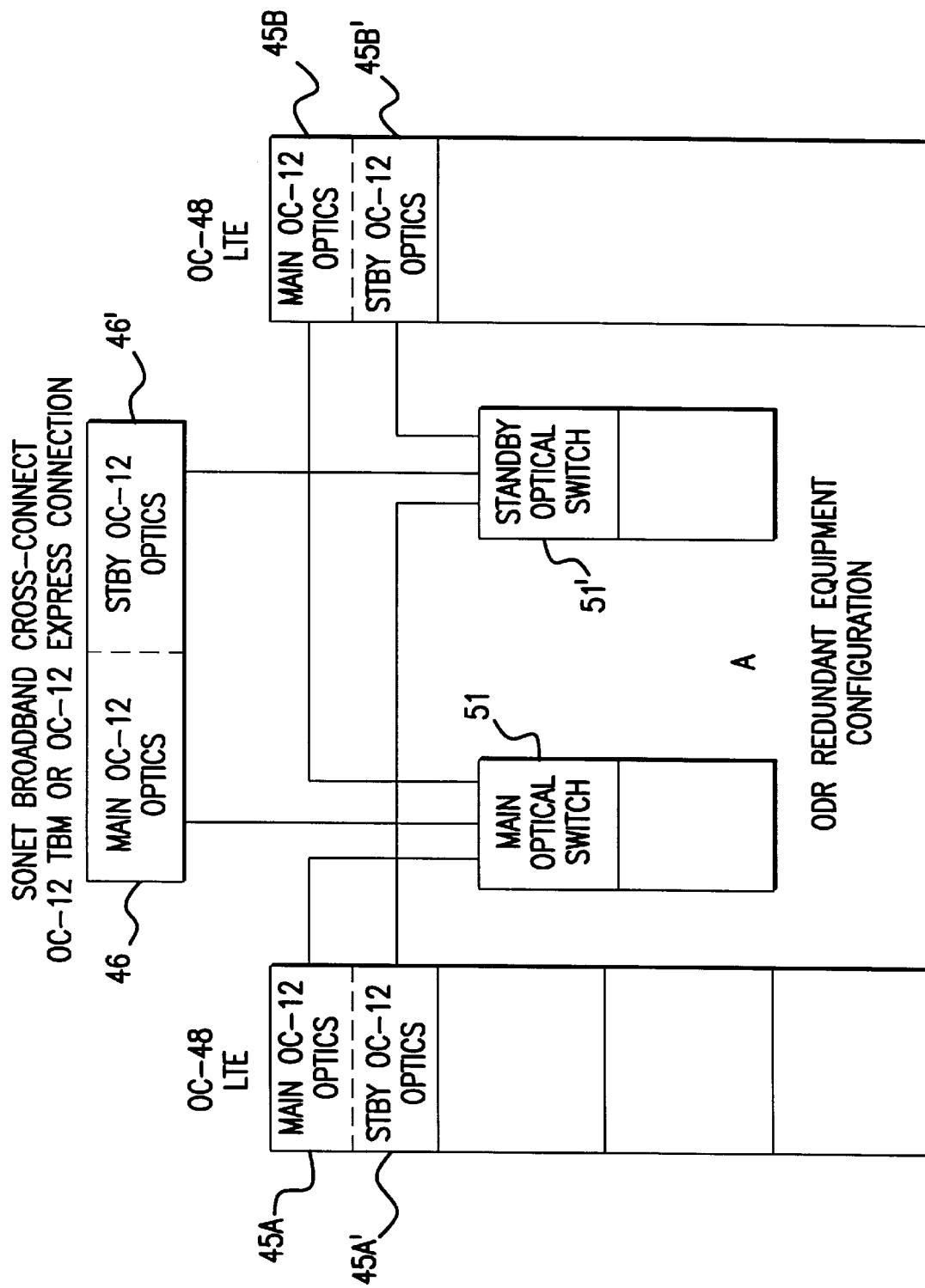
FIG. 12 shows a fully redundant optical switching ODR configuration according to the present invention.

Referring to FIG. 12, the SONET standard telemetry interface on OC-48 line terminating elements (LTEs) is used for controlling optical domain switch platforms of the present invention, e.g. optical switching platforms 51–54. Instructions to activate various restoration functions are received from a central ODR operations system 115 as described above. Both control and status indications are used in order to confirm that restoration activities have taken place correctly. The control and status signaling messages passed between the optical switch platform 51 and OC-48 LTE 45 can include, but are not limited to, the following messages shown in FIG. 11: Normal, Restore CW, Restore CCW, Bypass, Force to Restore, Inhibit, Normal Status, CW Status, CCW Status, Force Status, Inhibit Status, Failed to Switch, and Off Normal. Since the optical switch platform of the present invention is not an optical cross-connect, each platform at a node operates in parallel and therefore, there is no limit to the number of OC-12s services that can be restored by the present invention.

Fully Redundant ODR

According to another aspect of the present invention, network reliability is further improved by providing redundancy in optical domain restoration. For example, each node described above can be configured to include an additional duplicative optical paths for carrying the OC-12 and OC-48 traffic. FIG. 12 illustrates a redundant ODR configuration for node A. Redundant "standby" elements are identified with a prime mark.

A redundant stand-by optical restoration switch 51' is optically coupled to a standby optical OC-12 element 46' for connection to the gateway cross connect 41. The stand-by restoration switch 51' is also optically coupled to standby optical OC-12 elements in OC-48 LTE 45A' and 45B' to provide fully redundant optical communication between the gateway cross-connect 41 and the optical pipe rings 47 and 48 in the optical domain system 50.

Conclusion

While the examples of the present invention disclosed have been limited to OC-12 tributary connections, they may be replaced with OC-48 tributaries when OC-192 SONET transport becomes available. Since the ODR switch is bitrate independent, no modifications are required. Additionally, OC-3 or OC-1 optical connections could be used for low traffic applications.

While the present invention does not replace the electronic cross-connect, it does remove much of the restoration burden from the cross-connect and allows the cross-connect to function as it was primarily intended, that is, as a provisioning network element. This can greatly simplify a most difficult task in the SONET architecture, of end-to-end real-time provisioning. Once the dual role of restoration and provisioning is removed from the cross-connects, the singular role of the cross-connects of provisioning becomes much less complex.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. An optical domain restoration system for restoring communication over a first domain, the system comprising:

a first optical pipe ring within the first domain for carrying optical communication signals in first and second opposing directions around said first optical pipe ring;

a second optical pipe ring within the first domain for carrying optical communication signals in first and second opposing directions around said second optical pipe ring, the first direction around said second optical pipe ring being in a substantially same direction as the first direction around said first optical pipe ring; and a first plurality of optical switch platforms including adjacent first and second optical switch platforms, each optical switch platform being connected to said first and second optical pipe rings for switching optical communication signals between said first and second optical pipe rings, and each optical switch platform switching said optical communication signals without converting said optical communication signals from optical to electrical;

wherein, when a communication failure occurs between said first optical switch platform and said second optical switch platform, said first optical switch platform switches optical communication signals carried in the first direction in said first optical pipe ring between said first optical switch platform and said second optical switch platform to be carried in the second direction in said second optical pipe ring between said first optical switch platform and said second optical switch platform, and said second optical switch platform switches optical communication signals carried in the second direction in said first optical pipe ring between said second optical switch platform and said first optical switch platform to be carried in the first direction in said second optical pipe ring between said second optical switch platform and said first optical switch platform.

2. The system according to claim 1, wherein each optical switch platform is coupled to a mediation device for generating an alarm based on a loss of received light.

3. The system according to claim 2, further comprising a central management operation system for generating transmission-based restoration commands in response to alarms received from said mediation devices.

4. The system according to claim 3, wherein said central management operation system includes a memory for storing a state table of said transmission-based restoration commands for controlling switching in said first and second optical switching platforms.

5. The system according to claim 1, wherein said first optical pipe ring carries traffic having a higher priority than preemptive traffic carried by said second optical pipe ring.

6. The system according to claim 5, wherein said first and second optical switch platforms preempt said preemptive traffic during optical domain restoration.

7. The system according to claim 1, further comprising a second domain adjacent to and coupled with said first domain, said second domain comprising:

a third optical pipe ring within said second domain for carrying optical communication signals in first and second opposing directions around said third optical pipe ring, the first direction around said third optical pipe ring being in a substantially same direction as the first direction around said first optical pipe ring;

a fourth optical pipe ring within said second domain for carrying optical communication signals in first and second opposing directions around said fourth optical pipe ring, the first direction around said fourth optical pipe ring being in a substantially same direction as the first direction around said third optical pipe ring; and a second plurality of optical switch platforms including third and fourth optical switch platforms, each optical switch platform of said second plurality of optical switch platforms being connected to said third and fourth optical pipe rings for switching optical communication signals between said third and fourth optical pipe rings.

8. The system according to claim 7, further comprising first and second optical domain switches coupled to a common restoration path shared by the first and second domains for restoration.

9. An optical domain restoration method for restoring communication over a first domain, the method comprising the steps of:

carrying optical communication signals in first and second opposing directions around a first optical pipe ring;

carrying optical communication signals in first and second opposing directions around a second optical pipe ring, the first direction around said second optical pipe ring being in a substantially same direction as the first direction around said first optical pipe ring; and switching optical communication signals between said first and second optical pipe rings through a plurality of optical switch platforms wherein said switching occurs without converting said optical communication signals from optical to electrical;

during restoration, controlling said first optical switch platform to switch optical communication signals carried in the first direction in said first optical pipe ring between said first optical switch platform and said second optical switch platform to be carried in the second direction in said second optical pipe ring between said first optical switch platform and said second optical switch platform; and during restoration, controlling said second optical switch platform to switch optical communication signals carried in the second direction in said first optical pipe ring between said second optical switch platform and said first optical switch platform to be carried in the first direction in said second optical pipe ring between said second optical switch platform and said first optical switch platform.

10. The method according to claim 9, further comprising the steps of:

detecting a loss of received light at each optical switch platform; and generating an alarm in response to a detected loss of received light.

11. The method according to claim 10, further comprising the step of centrally managing transmission-based restoration of failed first and second optical pipe rings in response to an alarm.

12. The method according to claim 11, wherein said centrally managing step includes looking up transmission-based restoration commands in a state table for controlling switching in said first and second optical switch platforms.

13. The method according to claim 9, wherein during normal operation, said first optical pipe ring carries traffic having a higher priority than preemptive traffic carried by said second optical pipe ring.

14. The method according to claim 13, further comprising the step of preempting preemptive traffic carried by said second optical pipe ring during optical domain restoration.

15. The method according to claim 9, further comprising the steps of:

optically coupling a second domain adjacent to said first domain through a common restoration path;

carrying optical communication signals in first and second opposing directions around a third optical pipe ring, the first direction around said third optical pipe ring being in a substantially same direction as the first direction around said first optical pipe ring;

carrying optical communication signals in first and second opposing directions around a fourth optical pipe ring, the first direction around said fourth optical pipe ring being in a substantially same direction as the first direction around said second optical pipe ring; and switching optical communication signals between said third and fourth optical pipe rings.

* * * * *